United States Patent Office 3,198,596
Patented Aug. 3, 1965

3,198,596
PROCESS FOR DYEING POLYPROPYLENE FILAMENTS CONTAINING INORGANIC ALKALINE EARTH METAL COMPOUNDS WITH 1-AMINOANTHRAQUINONE DYES AND THE PRODUCT OBTAINED THEREBY
Duane Lionel Green, Long Branch, N.J., assignor to E. I. du Pont de Nemours and Company, Wilmington, Del., a corporation of Delaware
No Drawing. Filed Nov. 6, 1962, Ser. No. 235,843
4 Claims. (Cl. 8—39)

This invention relates to a novel fiber. More particularly, it is concerned with new and improved dyable and dyed fibers of polypropylene and to a method of preparing such fibers.

The discovery of the linear high molecular weight crystalline polypropylene has instigated much effort in the utilization of this polymer in fibers and films. One of the most serious defects of this polymer is its resistance to dyes of all types. It has been proposed that the polymer be colored by the incorporation of stable dyestuffs and pigments in the solutions or melts of the polymer before fabrication into shaped articles. This is an expensive procedure entailing careful process controls and the necessity of stocking large quantities of various colored yarns.

It is an object of this invention to provide a polypropylene composition in fiber or film shape which is readily dyeable by conventional dyeing techniques with certain dispersed dyes.

In accordance with the present invention, fibers, films and the like are made of a composition comprising from 99.5 to 80% of a crystalline propylene and from 0.5 to 20% of an inorganic alkaline earth additive. Preferably, the fibers contain from 2 to 10% of the alkaline earth additive.

By the expression "alkaline earth additive" is meant water-insoluble inorganic compounds of the alkaline earth metals. Satisfactory compounds include the oxides of magnesium, calcium and strontium; the carbonates of magnesium, barium, calcium and strontium; the sulfates of barium, calcium and strontium; and the silicates of magnesium, etc.

The alkaline earth additive-containing polypropylene fibers and films are dyeable by conventional disperse dyeing techniques with dyes described in detail below.

Dyes suitable for use in this invention are disperse dyes of the class consisting of 1-aminoanthraquinones and azo dyes, said dyes being free of —COOH, —SO$_3$H or —SO$_2$NH$_2$ groups and salts thereof. By "disperse dyes" is meant water-insoluble colors which are applied to the fibers from near-colloidal dispersoins. They have generally been referred to as "acetate dyes" in the past.

Anthraquinone dyes of the class described suitable for use in this invention include those bearing on the 1-position an —NHR group in which R is hydrogen, lower alkyl, hydroxy lower alkyl, phenyl and hydroxy phenyl and on the 3-position a member of the group consisting of hydrogen, lower alkoxy, chlorine and bromine with positions 6 and 7 bearing hydrogen. Preferred are those having, on the 2-position, a member of the group consisting of hydrogen, lower alkyl, lower alkoxy, chlorine, bromine, amine, and carbamyl; on the 4-position, a member of the group consisting of hydrogen, chlorine, bromine, hydroxy, amino, lower alkylamino, hydroxy lower alkyl amino and phenylamino; on the 5-position, hydrogen, hydroxy, nitro, amino or lower alkyl amino; and on the 8-position, hydrogen, amino or lower alkyl amino. The term "lower" alkyl or "alkoxy" includes such radicals having from 1–4 carbon atoms, as methyl, ethyl, propoxy, isopropyl, butoxy and the like.

Azo dyes of the class described suitable for use in this invention include monoazo dyes in which the nitrogen atoms of the azo group are attached to aromatic carbocyclic radicals having amino or substituted amino radicals situated para to an azo group nitrogen. See "The Chemistry of Synthetic Dyes and Pigments" by H. Lubs, page 167 (published by Reinhold Publishing Corporation of New York, 1955), for a discussion of disperse azo dyes.

In each of the following examples, powdered magnesium oxide (Merck Reagent grade) and powdered polypropylene is tumbled for 16–48 hours in a glass jar. The mixture is then melted in a screw melter and extruded as a small rod of about ¼" diameter. The rod of the melt-blended mixture is chilled and powdered on a hammer mill. This powdered mixture is then melted at about 272° C. and extruded through a 20-hole spinneret at 260°. The solidified filaments are advanced by a feed roll at 245 yards per minute to a draw roll running at 475 yards per minute and thereafter wound up on a package.

A polypropylene of melt index 1.1 is used in all examples of Table II except 13, 14, 16, 17, 19, and 20 where the above polypropylene has been thermally degraded to a melt index of 15 and then extracted with boiling n-heptane before mixing with the magnesium oxide.

To demonstrate dyeability of the fibers formed as described above, a 0.6 gram sample of each is scoured for 20 minutes at 200° F. in a mild detergent and is then dyed at 180° F. for 1 hour in 30 ml. of an aqueous dispersion of the dye of Table I (1% of the fiber weight) containing about 0.08 gram/liter of the sodium salt of the sulfate of the condensation product of ethylene oxide oleyl alcohol and 0.25 gram/liter of trisodium phosphate. The samples are rinsed with cold water until the rinse is clear.

Dyes A, B, and C were applied in a similar manner but dyed for 1½ hours at the boil, followed by a 20-minute scour at 180° F. in a 0.06% aqueous solution of a non-ionic surfactant (the condensation product of 20 mols of ethylene oxide and 1 mol of a C$_{18}$ alcohol).

In general all the fibers are dyed to even shades. Deep and equivalent shades are otbained from fibers having 5 or 10% MgO, while progressively lighter shades are obtained from fibers having 2, 1, or ½% MgO.

Any of the dyes of Table I and mixtures can be used to give good dyeing on the above fibers.

Compositions containing 95% polypropylene and 5% of calcium oxide, strontium oxide, magnesium carbonate, barium carbonate, barium sulfate, calcium carbonate, calcium sulfate, strontium carbonate or strontium sulfate are prepared and fibers spun as above. The fibers dye to deep, even shades with any of the dyes of Table I.

Fibers containing no additive are undyed by the above dyeing procedure or at the most tinted so slightly as to be of no utility as a dyed yarn.

It is surprising that dyes with structures similar to those in Table I but containing —SO$_3$Na, or —SO$_2$NH$_2$ groups (e.g., C.I. acid red 114, C.I. acid blue 25, and C.I. acid green 25 to name a few) showed no dyeability on the fibers of this invention when dyed according to conventional procedures for these dyes.

The dyed fibers of this invention have physical properties, other than dyeability, equivalent to those of polypropylene per se.

Table I

| Dye | Reference | |
|---|---|---|
| A | C.I. Disp. Red 4 | 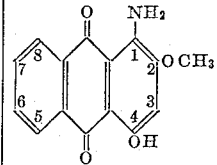 |
| B | C.I. 60740 | 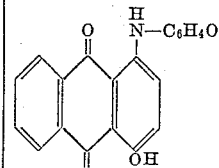 |
| C | C.I. 62010 (without sulfonating) | 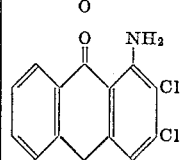 |
| D | C.I. Disp. Violet 4 | 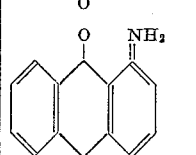 |
| E | C.I. Disp. Blue 3 | 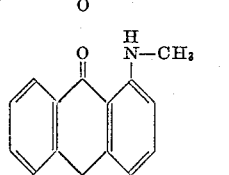 |
| F | C.I. Disp. Blue 1 | 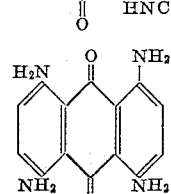 |
| G | C.I. Disp. Red 15 | 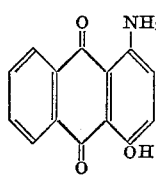 |
| H | C.I. Disp. Orange 11 | 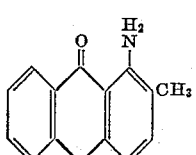 |
| I | Br. 214,112 (disp. yellow) | 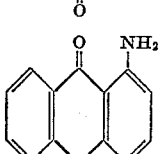 |

| Dye | Reference | Structure |
|---|---|---|
| J | C.I. Disp. Red 11 (pink) | 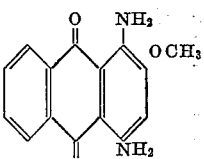 |
| K | Br. 214,112 (disp. orange) | 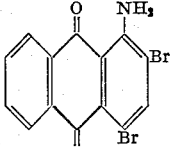 |
| L | U.S. 1,871,821 (disp. blue) | 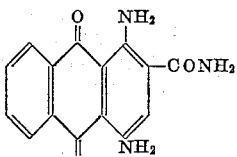 |
| M | C.I. Disp. Violet 8 | 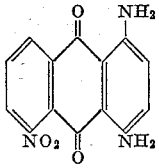 |
| N | C.I. Disp. Red 4 | 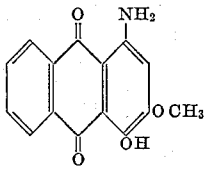 |
| O | C.I. Disperse Yellow 3 | 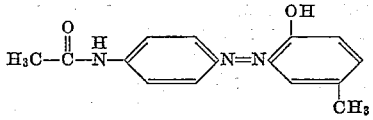 |
| P | C.I. Disperse Red 1 | 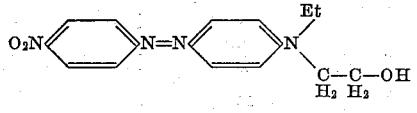 |
| Q | C.I. Disperse Red 17 |  |

*Table II*

| Example | Additive Content, Percent of Total Weight | Dye | Fiber Color (before scour) |
|---|---|---|---|
| 1 | ½ | Q | Light lavender red. |
| 2 | 1 | Q | Medium lavender red. |
| 3 | 2 | Q | Do. |
| 4 | ½ | F | Medium blue. |
| 5 | 1 | F | Do. |
| 6 | 2 | F | Do. |
| 7 | 10 | F | Dark blue. |
| 8 | 2 | A | Pale pink. |
| 9 | 2 | C | Pale lavender. |
| 10 | 2 | B | Pale blue. |
| 11 | 2 | D | Pale blue violet. |
| 12 | 2 | E | Pale blue. |
| 13 | 5 | E | Medium dark blue. |
| 14 | 10 | E | Do. |
| 15 | 2 | O | Medium yellow. |
| 16 | 5 | O | Medium dull yellow. |
| 17 | 10 | O | Do. |
| 18 | 2 | P | Rose. |
| 19 | 5 | P | Medium rose. |
| 20 | 10 | P | Do. |
| 21 | 10 | G | Medium lavender. |
| 22 | 10 | H | Medium orange. |

Polypropylenes suitable for use in this invention are highly crystalline as shown by sharp and distinct X-ray diffraction patterns. The polymer may be predominantly isotactic in character or block copolymers of the isotactic and non-isotactic forms may be used. The polypropylene may be of any high molecular weight polymer characterized by a melt index (ASTM Standards, 1958 D-1238-57T, part 9, page 38) of 0.1 to 200. Preferably a polymer having a melt index of 0.5 to 20 is used.

Dyes other than those illustrated above, which are useful in preparing the dyed fibers of the invention include:

| Dye: | References |
|---|---|
| 1-amino-4-anilino-anthraquinone | C.I. Disperse Blue 19. |
| 1-4-di(hydroxyethyl)amino-5,8-dihydroxyanthraquinone | C.I. Disperse Blue 7. |
| 1-amino-4,8-dihydroxy-5-ethyl-aminoanthraquinone | C.I. Disperse 63295. |
| 1,2-diaminoanthraquinone | German 523,523. |
| 1,2-dianilinoanthraquinone | U.S. 1,394,851. |
| 1-amino-4-chloroanthraquinone | British 214,112. |
| 1,8-alkylamino-4,5-dihydroxy anthraquinone | British 430,658. |

The polymer and alkaline earth additive can be blended by any conventional means. The components of the blend can be mixed in a ball mill and then melt extruded with conventional equipment or the mixture can be melted together and blended by shear mixing as in a screw extruder before being extruded directly into a useful shape or polymer chips for subsequent processing. The conditions of blending (time, temperature and shear) should be selected so as to keep the degradation of the polypropylene to a minimum. In some cases the addition of a stabilizer to prevent the degradation of the polypropylene will be desirable.

What is claimed is:
1. A dyed crystalline polypropylene filament consisting essentially of a dyeing adjuvant constituted by from about 0.5 to 20% by weight of a water-insoluble, inorganic alkaline earth metal compound and a disperse dye, said dye being a 1-aminoanthraquinone of the formula

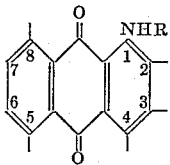

wherein R is selected from the group consisting of hydrogen, lower alkyl, hydroxy lower alkyl, phenyl and hydroxy phenyl, said anthraquinone having (1) on the 3-position a member of the group consisting of hydrogen, lower alkoxy, chlorine, and bromine; (2) on the 2-position a member of the group consisting of hydrogen, lower alkyl, lower alkoxy, chlorine, bromine, amino, carbamyl; (3) on the 4-position a member of the group consisting of hydrogen, chlorine, bromine, hydroxy, amino, lower alkyl amino, hydroxy lower alkyl amino, and phenyl amino; (4) on the 5-position a member of the group consisting of hydrogen, hydroxy, nitro, amino and lower alkyl amino, and (5) on the 8-position a member of the group consisting of hydrogen, amino and lower alkyl amino.

2. The filament of claim 1 wherein the water-insoluble, inorganic compound is selected from the group consisting of the oxides, carbonates, sulfates and silicates of the alkaline earth metals.

3. The method of preparing a dyed polypropylene filament consisting essentially of incorporating within the filament, as the sole dyeing adjuvant, a water-insoluble, inorganic alkaline earth metal compound and applying a dye to the said filament, the said dye being a disperse dye of the class consisting of 1-aminoanthraquinone of the formula

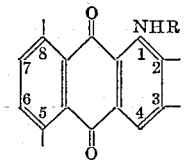

wherein R is selected from the group consisting of hydrogen, lower alkyl, hydroxy lower alkyl, phenyl and hydroxy phenyl, said anthraquinone having (1) on the 3-position a member of the group consisting of hydrogen, lower alkoxy, chlorine, and bromine; (2) on the 2-position a member of the group consisting of hydrogen, lower alkyl, lower alkoxy, chlorine, bromine, amino, carbamyl; (3) on the 4-position a member of the group consisting of hydrogen, chlorine, bromine, hydroxy, amino, lower alkyl amino, hydroxy lower alkyl amino, and phenyl amino; (4) on the 5-position a member of the group consisting of hydrogen, hydroxy, nitro, amino and lower alkyl amino, and (5) on the 8-position a member of the group consisting of hydrogen, amino and lower alkyl amino.

4. The process of claim 3 wherein the water insoluble, inorganic compound is selected from the group consisting of oxides, carbonates, sulfates, and silicates of alkaline earth metals.

References Cited by the Examiner

UNITED STATES PATENTS

| | | | |
|---|---|---|---|
| 1,980,429 | 11/34 | Parkinson | 8—99 |
| 2,843,580 | 7/58 | Straley et al. | 260—149 |
| 2,857,372 | 10/58 | Straley et al. | 260—146 |
| 2,865,909 | 12/58 | Straley et al. | 260—146 |
| 2,908,677 | 10/59 | Straley et al. | 260—147 |
| 2,984,634 | 5/61 | Caldwell et al. | |
| 3,023,072 | 2/62 | Dabrowski. | |

FOREIGN PATENTS 286,761  3/28  Great Britain.

OTHER REFERENCES

Colour Index, vol. I, pages 1716 and 1721, 2nd ed., 1956, Lowell Technological Institute, Lowell, Mass.

Lubs: The Chemistry of Synthetic Dyes and Pigments, pp. 167–172.

NORMAN G. TORCHIN, *Primary Examiner.*

ABRAHAM H. WINKELSTEIN, *Examiner.*